United States Patent [19]

Shaw et al.

[11] 3,992,055

[45] Nov. 16, 1976

[54] SPORTSMAN SLING SEAT

[76] Inventors: Jack B. Shaw, 2710 Bedford St.;
Donald E. Shaw, 325 Suie St., both
of Johnstown, Pa. 15904

[22] Filed: Jan. 29, 1975

[21] Appl. No.: 545,141

[52] U.S. Cl. .................................................. 297/217
[51] Int. Cl.² ............................................... A47C 7/62
[58] Field of Search ............ 297/217, 17, 118, 457,
297/441, 452, 385; 248/221, 435; 182/187,
9; 108/152, 135; 5/89; 224/9, 6

[56] References Cited
UNITED STATES PATENTS

| | | | |
|---|---|---|---|
| 1,120,496 | 12/1914 | Holsclaw | 182/9 |
| 2,549,679 | 4/1951 | Foote | 248/221 |
| 2,550,851 | 5/1951 | Nichols | 224/6 |
| 2,722,968 | 11/1955 | Smith | 297/457 |
| 2,847,059 | 8/1958 | Klins | 182/187 X |
| 2,851,085 | 9/1958 | Woodward | 182/187 X |
| 3,025,107 | 3/1962 | Marshall | 182/187 X |
| 3,030,160 | 4/1962 | Tandy | 182/187 X |
| 3,587,952 | 6/1971 | Higuchi | 224/6 |
| 3,598,443 | 8/1971 | Stoffel | 297/389 |
| 3,638,588 | 2/1972 | Abbott | 248/435 X |

FOREIGN PATENTS OR APPLICATIONS

| | | | |
|---|---|---|---|
| 12,567 | 0000 | Germany | 224/6 |

Primary Examiner—James T. McCall
Attorney, Agent, or Firm—Fidelman, Wolffe & Waldron

[57] ABSTRACT

A collapsible chair having a strap for encompassing a vertical support and a seat made of a substantially triangular piece of material mounted to the strap so as to have a generally U-shaped cross-sectional configuration. The strap is two pieces, joined at one of their ends by a releasable fastener and pivotally joined at their other ends. A pair of hooks detachably mount the seat to eyelets in the strap.

9 Claims, 3 Drawing Figures

SPORTSMAN SLING SEAT

BACKGROUND OF THE INVENTION

1. Field of the Invention

The present invention relates generally to seats and more particularly to a collapsible, easily portable sportsman's seat.

2. Description of the Prior Art

The sportsman generally spends long periods of time on his feet in the woods, away from civilization. Normally, it is difficult to find a comfortable, convenient and/or safe place in which to sit while resting or waiting for game. In the summer, the sportsman usually sits on a rock, logs or other such natural resources close to the ground. In the winter, these objects are often wet from rain or snow and, therefore, are very uncomfortable and unsafe to sit on. This situation has resulted in the production of a multitude of collapsible chairs designed to provide the sportsman with a safe and comfortable place to sit.

The collapsible chairs of the prior art have included many rigid pieces. Therefore, these are unnecessarily expensive and bulky, and also are difficult to assemble and transport. Attempts have been made to totally eliminate the rigid parts of a collapsible seat, but have been done at the expense of the seat's durability and structural strength.

SUMMARY OF THE INVENTION

The present invention provides an inexpensive, durable, compact, collapsible chair which is mountable to a vertical support, such as a tree. A generally triangular piece of material forming a seat is attached to a strap which encompasses the tree. A cord is attached to the edges of the seat to encompass the seat and add rigidity to the edges thereof. A pair of hooks are connected to the cord at two corners of the seat for detachably mounting the seat to at least a pair of eyelets in the strap. The triangular piece of material, the cord and the hooks cause the seat to assume a generally U-shaped cross-sectional configuration with the ends of the U-shape being adjacent to the strap. The strap is formed of two pieces of material joined at one of their ends by a releasable fastener and pivotally joined at their other ends. The pivotal connection extends the life of the belt by providing a stress relieving mechanism.

OBJECTS OF THE INVENTION

An object of the present invention is to provide an inexpensive, compact, collapsible sportsman's chair.

Another object of the invention is to provide a collapsible sportsman's chair with a limited number of rigid elements.

A further object of the invention is to provide an inexpensive, collapsible, sportsman's chair without sacrificing durability and structural strength.

Still another object is to provide a collapsible sportsman's seat which is easy to assemble and transport compactly.

Other objects, advantages and novel features of the present invention will become apparent from the following detailed description of the invention when considered in conjunction with the accompanying drawings.

DESCRIPTION OF THE PREFERRED EMBODIMENTS

Figure 1:
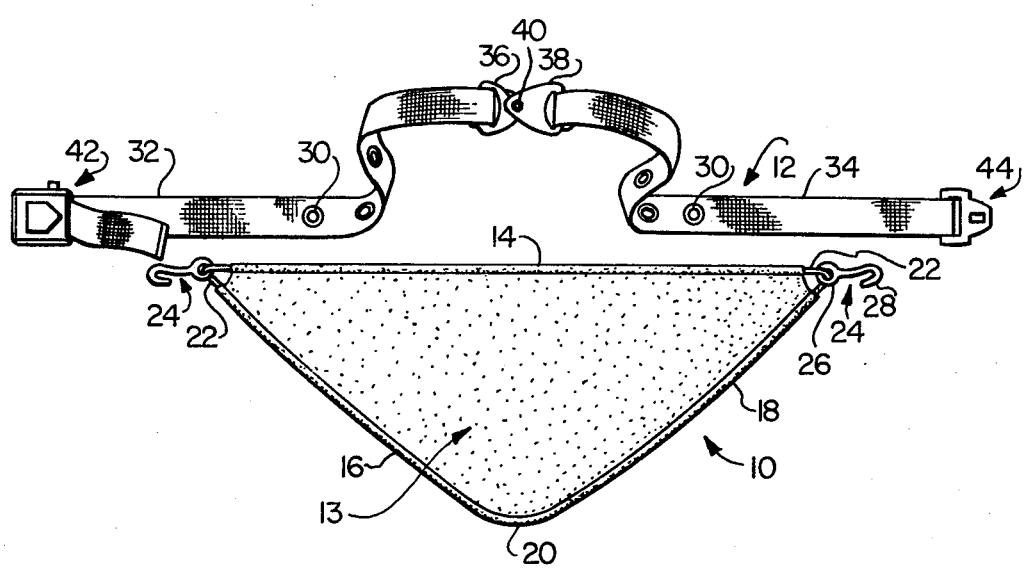
FIG. 1 is a plain view of the sportsman sling seat of the present invention.

FIG. 1, which illustrates a preferred embodiment of the collapsible sling seat or chair, shows a seat portion 10 and a strap portion 12. The seat portion 10 is made of a single piece of material 13 (which may be canvas, nylon or dacron, for example). The material must be lightweight, though structurally sound so as to be able to support the weight of the sportsman. The seat 10 is substantially triangular in shape, having a back or base edge 14, two side edges 16 and 18 (at oblique angles to the back edge 14) which meet at a front edge 20. Though the front edge 20 is shown as rounded, it is well within the scope of the present invention for the front edge 20 to be flat and parallel to the back edge 14, though it must be of significantly shorter length than the back edge 14.

A continuous cord 22 is attached to the edges 14, 16, 18 and 20 so as to encompass the material 13. Cord 20 may be of nylon polypropylene or other lightweight bendable materials capable of taking an axial load without significant elongation. The cord 22 may be attached to material 13 by any well known means, but is shown as being attached by folding the edges of the material 13 back onto the body where they are single or double stitched. As will be explained more fully below, the cord 22 provides rigidity to the edges 14, 16, 18 and 20 and thus allows the seat portion 10 to form a general U-shape cross-section configuration sling.

The seat portion 10 is detachably mounted to the strap portion 12, by a set of hooks and eyelets. A pair of hooks 24 are attached to the cord 22 at the corners of the edges 14 and 16 and 14 and 18 through eye 26 of hooks 24. The bent end 28 of hook 24 is received in an eyelet 30 in belt portion 12. As shown, a plurality of pairs of eyelets 30 are provided in belt portion 12 to allow adjustment of the height and/or width of the final U-shaped configuration of seat portion 10. Though the attachment of the seat portion 10 to the belt portion 12 is shown as being a hook and eye, any other male or female (or other complementary) fasteners may be used to detachably mount the seat portion 10 to the strap portion 12.

The strap portion 12 comprises two pieces (32 and 34) made of a standard web material. The two pieces 32 and 34 have hinge elements 36 and 38 fastened to one end thereof. A pin 40 interconnects the hinge elements 36 and 38 and allow these hinge elements and, consequently their respective ends of strap pieces 32 and 34, to pivot relative to each other. As will be explained below, this provides a strain relieving mechanism which extends the life of the strap portion 12. Secured to the other ends of strap pieces 32 and 34 is a standard, releasable fastener (which is shown as a buckle having elements 42 and 44). As is well known, element 44 is secured to strap portion 34, whereas element 42 is slidably or adjustably mounted to strap portion 32. Other types of fasteners can be used which provide an adjustment for the length of the total strap portion 12 for encompassing vertical supports of various diameters.

Figure 2:
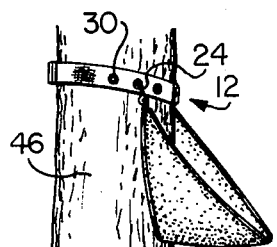
FIG. 2 is a perspective of the subject invention mounted to a vertical support.
Figure 3:
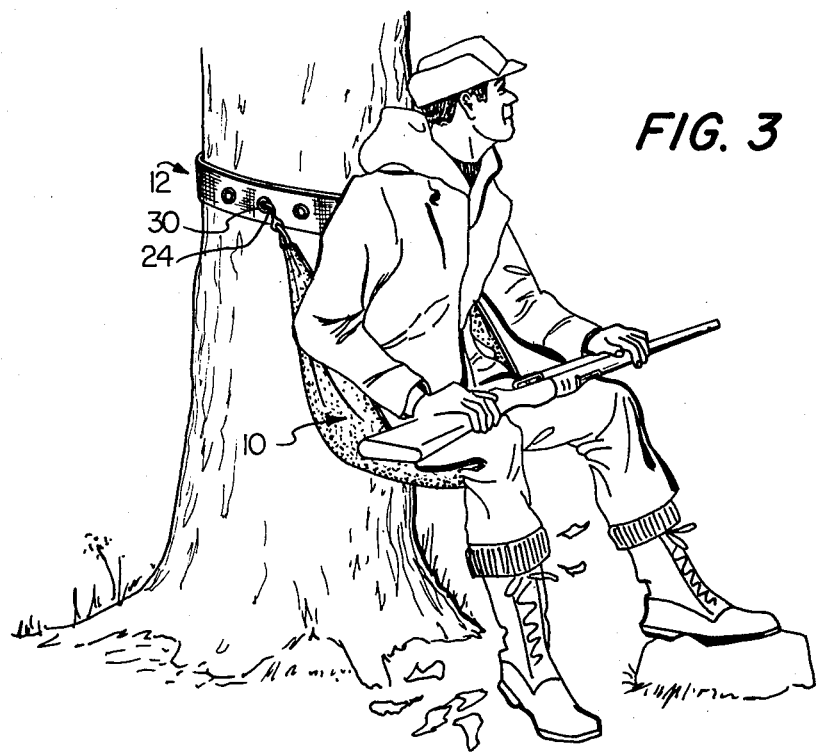
FIG. 3 is a perspective view of a seat according to the present invention supported by a tree and occupied by an individual.

As illustrated in FIG. 2, the strap 12 encompasses a vertical support 46 which may be, for example, a tree. The hooks 24 are received in eyelets 30 so as to attach the seat portion 10 to the belt 12. The seat 10 assumes a general U-shape cross-sectional configuration, with the ends of the legs of the U-shape being adjacent to the strap 12. This configuration is very similar to a sling used to support a broken arm. The cord 22 attached to the material 13 of seat 10 provides rigidity to the edges and thereby assists the material 13 in assuming the U-shape configuration. The cord 22 also provides structural integrity and strength to the seat by assuming part of the load asserted by the sportsman when sitting in the seat, as shown in FIG. 3. By proper selection of the pair of eyelets 30 to which the hooks 24 are attached, the height of the seat 10 relative to the belt 12 may be varied as well as the width of the seat when the sportsman sits therein.

A majority of the load of the sportsman's weight is transmitted from the seat 10 to the strap 12 through the hook and eyelets. The load transmitted thereby produces a maximum amount of stress at two points in the belt 12, namely, the center of the belt (represented by pin 40) and the connection of the fastener elements 42 and 44. When the sportsman sits in the seat, his weight causes strap portions 32 and 34 to rotate relative to each other around pin 40. This relieves the normal stress and strain produced in a belt made of a single piece of material. It should be noted that, at the major points of strain (namely, at hinges 36, 38 and 40 and at the fasteners 42 and 44), these elements are made of metal and thus the life of the strap is extended. Similarly, by the use of metal hook 24 and metal eyelets 30, the wear and tear produced by the attachment of the seat to the strap is decreased and the useful life of the chair is increased.

The belt portion 12, being made of web material, may be rolled up into a compact element or by adjusting buckle element 42, the strap 12 may be worn or carried around the waist of the sportsman. The present collapsible seat is highly portable and easy to carry without bulk by minimizing the number of rigid elements to the hooks 24 and the eyelets 30, the hinges 36, 38 and 40 and the buckles 42 and 44.

From the preceding description of the preferred embodiments, it is evident that the objects of this invention are attained and, although the invention has been described and illustrated in detail, it is to be clearly understood that the same is by way of illustration and example only and is not to be taken by way of limitation. The spirit and scope of this invention are limited only by the terms of the appended claims.

What is claimed is:

1. A collapsible seat for attachment to a vertical column comprising:
    a strap for encompassing said column having a pair of hinge elements pinned together for relieving stress by allowing pivotal motion;
    a sling consisting of a single piece of flexible planar material having a front, back and two side edges, said back edge being longer then said front edges, and said side edges being oblique to said back edges; and
    means for detachably mounting said sling directly to said strap at the ends of said back edge.

2. The chair of claim 1 wherein said front edge is sufficiently small that said sling is substantially triangular in shape.

3. The chair of claim 1 wherein said mounting means includes a pair of short hooks extending from approximately the back ends of said seat to at least one pair of apertures in said strap for receiving said hooks.

4. The chair of claim 3 wherein a continuous cord is attached to the edges of said sling, and said hooks attach to said cord at the corners of said back edge, said cord providing rigidity to the edges of said sling.

5. The chair of claim 1 wherein said strap comprises:
    two elongate pieces of flexible material;
    said pair of hinge elements are metallic and join one end of said pieces of material together; and
    means mounted on the other ends of said pieces of material for detachably fastening said other ends together.

6. A chair comprising:
    a strap for encompassing a vertical support;
    a seat being a planar substantially triangular sheet of flexible material;
    a bendable material attached continuously along all sides of said seat; and
    means connecting two corners of said seat directly to said strap said means being spaced apart for causing the side of said seat between said two corners to assume a generally U-shaped configuration with the ends of the legs of said U-shape being said two corners and being adjacent said strap.

7. The chair of claim 6 wherein said bendable material is a cord attached to the edges of said seat to encompass said seat and means connected to said cord at said two corners of said seat for mounting said seat directly to said strap.

8. The chair of claim 6 wherein said strap comprises two elongate pieces of flexible material, a pair of pinned metallic hinge elements pivotally connecting one of the ends of said pieces together and a fastener means for releasable joining the other ends of said pieces together.

9. The chair of claim 6 wherein said strap is flat.

* * * * *